United States Patent [19]
Kelly

[11] 3,711,850
[45] Jan. 16, 1973

[54] DIGITAL OHMMETER CIRCUIT
[75] Inventor: Austin T. Kelly, Morristown, N.J.
[73] Assignee: Weston Instruments, Inc., Newark, N.J.
[22] Filed: Dec. 3, 1970
[21] Appl. No.: 94,739

[30] Foreign Application Priority Data
Dec. 5, 1969 France..................6942066

[52] U.S. Cl..................340/347 NT, 324/62
[51] Int. Cl..................H03k 13/20
[58] Field of Search..................340/347; 235/183; 324/62–65, 99

[56] References Cited

UNITED STATES PATENTS 3,525,093 8/1970 Marshall..................340/347 NT

OTHER PUBLICATIONS

Hermann Schmid, "Electronics," pg. 88–94, Nov. 28, 1966.

Primary Examiner—Maynard R. Wilbur
Assistant Examiner—Charles D. Miller
Attorney—William R. Sherman, Stewart F. Moore, Jerry M. Presson, Leonard R. Fellen and Roylance, Abrams, Berdo & Kaul

[57] ABSTRACT

A digital ohmmeter includes a current source having very high effective internal resistance to develop an analog signal across an unknown resistor and an analog-to-digital converter connected to the unknown resistor. The current source includes a differential operational amplifier with a conventional source of current connected to its integrating amplifier and to the inverting input and negative feedback from the output to the non-inverting input. The output current is connected through a known resistance to the unknown resistor and to the non-inverting input of a second differential amplifier having capacitive feedback to its inverting output, forming an integrator. The integrator produces a dual-slope output under the control of a timer and level detector which also gates clock pulses to a counter to produce a count proportional to the resistance of the unknown. A reference current source is switched to the inverting input of the non-inverting input of the source amplifier.

2 Claims, 1 Drawing Figure

PATENTED JAN 16 1973
3,711,850
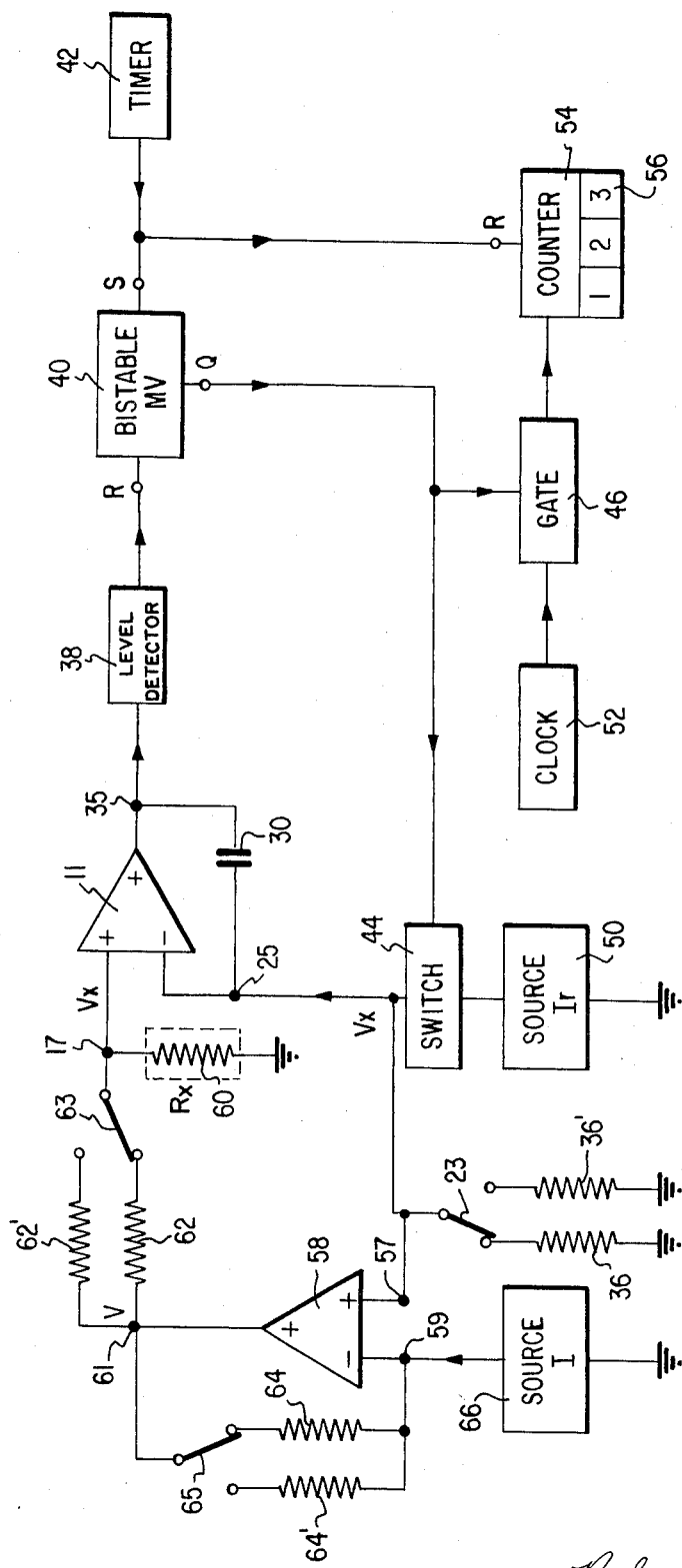
INVENTOR
AUSTIN T. KELLY
BY Roylance, Abrams, Berdo & Kaul
ATTORNEYS.

DIGITAL OHMMETER CIRCUIT

This invention relates to analog-to-digital converters and, more specifically, to a digital ohmmeter.

As recognized by those skilled in the art, the measurement of DC resistance is a theoretically simple problem in which either a known current or a known voltage is applied to an unknown resistance and the resulting voltage or current is measured so that the resistance can be calculated, manually or automatically, from Ohm's Law. It follows that if one wishes to perform a resistance measurement with a digital meter it should only be necessary to connect a conventional digital voltmeter to the resistance, apply current from a source, and measure the resulting voltage.

When the resistor to be measured has a small or medium ohmic value, i.e., equal to not more than 1 megohm, the source delivering the direct current may, without too much difficulty, be made to behave as if it possessed a very high internal resistance (at least 100 times higher) in comparison with the unknown resistance to be measured. In practice, such a source includes, for example, a current-injection connected transistor.

However, when the measured resistance is higher than one megohm, the design of such a source becomes more difficult and more costly. Moreover, the input resistance to the analog-to-digital converter to which is applied the analog signal of the measured resistance must also be very high in comparison with the measured resistance so that the analog signal to be converted is not disturbed. To accomplish this, a very high input impedance matching preamplifier can be used. An object of the present invention is to provide a digital ohmmeter which is simple and inexpensive but which provides very high internal resistance in a current source and very high input impedance to the analog-to-digital conversion.

Another object is to provide a digital ohmmeter incorporating an integrating circuit, the characteristics of which permit a relatively inexpensive ohmmeter having good accuracy for high resistance measurements.

Briefly described, the apparatus of the invention includes a differential amplifier integrating circuit to one input of which the unknown resistance is connected. A current source is connected to one input of a second differential amplifier having negative feedback, the output of the second amplifier being connected to the unknown resistance to provide the input signal for the integrator. The integrator is thus caused to generate a slope in one direction until a reference current source associated with a switch causes the integrator to generate a second slope the sign of which is opposite to that of the first slope. A timing circuit controls the periodic closing of the switch and a level sensing circuit reopens the switch. The level detector actuates a bistable circuit which opens a gate permitting clock pulses to be counted during the second slope. The system is restored toward a reference level while the reference current source is connected.

In order that the manner in which the foregoing and other objects are attained in accordance with the invention can be understood in detail, a particularly advantageous embodiment thereof will be described with reference to the accompanying drawing, which forms a part of this specification and which shows a schematic diagram of a digital voltmeter in accordance with the invention.

As shown in the figure, an analog-to-digital converter adapted to perform in accordance with the present invention is connected to measure the unknown value $R_x$ of a resistor 60. Resistor 60 is connected between a junction point 17 and a point of reference potential such as ground. Junction 17 is connected to the direct or non-inverting input terminal of a high gain differential amplifier 11. The output terminal of the amplifier is connected to a junction 35 to which is connected one terminal of an integrating capacitor 30, the other terminal of the capacitor being connected to a junction 25 at the inverting input of differential amplifier 11. Junction 35 is also connected to the input terminal of a level detector circuit 38 which provides a logic output when the output of integrating amplifier 11 crosses a preselected level. The output of detector 38 is connected to the reset input terminal R of a bistable multivibrator circuit 40. The set input S of multivibrator 40 is connected to the output of a timer circuit 42 which provides periodic pulses of relatively low frequency, which pulses determine the conversion period and the integration time period.

The output Q of the multivibrator 40 is connected to the triggering terminal of a gate circuit 46 which is connected between the output of a clock circuit 52 and the input of a pulse counter 54. The output of timer 42 is also connected to the reset input of counter 54 to reset the counter each time multivibrator 40 is set. Clock circuit 52 provides a continuous train of high frequency timing pulses, which pulses are gated by gate 46, the gate pulses being counted by counter 54 and displayed by a conventional digital indicator 56.

The output Q of the multivibrator 40 is also connected to the triggering terminal of a switch 44. The switchable conductive path of switch 44 is connected between the output of a current source 50 and junction 25 at the inverting input of amplifier 11. Source 50 provides a constant reference current $I_r$ which is connected to the integrator 11 by switch 44 at appropriate times to discharge capacitor 30. It will be observed that junction 25, at the inverting input of amplifier 11, is also connected to a selected one of two integrating and gain adjusting resistors, 36 and 36', either one of which can be selected by the position of a single-pole, double-throw switch 23. Further, junction 25 is connected to the non-inverting input junction 57 of a differential operational amplifier 58, the inverting input junction 59 of which is connected to the output of a current source 66 which provides a current of magnitude I and also to one terminal of each resistors 64 and 64'. The other terminals of the resistors are connected to the fixed contacts of a single-pole, double-throw switch 65, the movable contact of which is connected to a junction 61 at the output of amplifier 58. Junction 61 is connected to one terminal of each of resistors 62 and 62', the other terminals of which are connected to the fixed contacts of a single-pole, double-throw switching 63, the movable contact of which is connected to junction 17 at the direct input of amplifier 11. As the case with switch 23, switches 63 and 65 can be moved to either of two positions to select appropriate values from resistors 62, 62', 64 and 64' for appropriate gain values for the associated amplifiers.

If we assign the value $R_1$ to the resistor selected by switch 65, the value $R_2$ to the resistor selected by switch 63, and denote the voltage 61 by the symbol V and the voltage at junctions 17, 25, 57 and 59 as $V_x$; and if we further assume, for simplicity, that operational amplifiers 11 and 58 are perfect amplifiers having nearly infinite input resistances and gains so that the input currents are negligible and the potential differences existing between their input terminals are virtually 0 (these being assumptions which can be closely approached in practice), the following relationships will hold:

$$V = -IR_1 + V_x \quad (1)$$

$$V_x = R_x V / (R_2 + R_x) \quad (2)$$

From 2, $$V = [V_x(R_2 + R_x)]/R_x, \quad (3)$$

so that $$[V_x(R_2 + R_x)]/R_x = -IR_1 + V_x \quad (4)$$

and solving for $V_x$, $$V_x = -(IR_1/R_2)R_x \quad (5)$$

From equation 5, it will be seen that the circuit produces an analog signal $V_x$ which is proportional to the ohmic value $R_x$ of the resistor to be measured, which signal is applied to an analog-to-digital converter having a very high resistance input.

From the above it will be seen that the two requirements for obtaining an accurate digital ohmmeter are simultaneously met, i.e., a current source having very high internal resistance and an analog-to-digital converter to which the voltage corresponding to the resistance volume is supplied as a high input resistance.

The operation of the converter commences with the application of the voltage $V_x$ at junction 17 to the direct input of integrating amplifier 11, causing the amplifier to produce a ramp in one direction. At a preselected time determined by a pulse at the frequency of the output of timer 42, a pulse is applied to bistable multivibrator 40, setting that multivibrator and closing switch 44, causing current $I_r$ to be applied to the inverting input of amplifier 11. Application of the reference current $I_r$ causes the integrator to produce a slope in the opposite direction, ramping down toward a reference level. When the reference level is reached by the output of amplifier 11 this event is detected by level detector 38 which produces a logic output resetting multivibrator 40 and opening switch 44. The setting and resetting of multivibrator 40 opens and closes, respectively, gate 46, permitting pulses from clock 52, which are produced at a substantially higher frequency than those from timer 42, to pass to counter 54, to be counted, and to be displayed. Resetting of multivibrator 40 and closing of switch 44 removes the reference current source from amplifier 11, leaving the current source 66 as the only input to the amplifier, again permitting amplifier 11 to produce a ramp in the first direction, initiating a repeat of the process.

Although a device such as that described above is most especially suited to the measurement of high resistances (greater than 1 megohm), it will be apparent that it is also suitable for the measurement of small or medium ohmic values. However, in this case, one or more of the three parameters $I$, $R_1$ and $R_2$ which determine the proportionality coefficient existing between $V_x$ and $R_x$ be modified such that the value of $V_x$ is always situated within the optimum input amplitude range of the analog-to-digital converter characteristics. For this purpose, a plurality of values having, for example, ratios of 10 in relation to each other are provided for as illustrated in the figure. In the case of $R_1$, switch 65 provides for the selection of either resistor 64 or resistor 64', one of which has a resistance value which is preferably 10 times greater than the other. For the value of $R_2$, switch 63 permits selection between resistors 62 and 62', which preferably bear a similar factor-of-ten relationship. Selection of the appropriate resistor, in accordance with the front panel calibrations, allows the order of magnitude of the resistance $R_x$ to be measured so that $V_x$ is always situated in the suitable range.

Furthermore, by changing the value of the integrating and gain adjustment resistor by selection of one of resistors 36 and 36' with switch 23 it is possible to modify the optimum input amplitude range of the converter, thereby increasing the measuring possibilities of the apparatus by one or more decades. It will be noted that, in practice, the three switches 23, 63 and 65 can constitute the different elements of a single sensitivity selector.

While one advantageous embodiment has been chosen to illustrate the invention it will be understood by those skilled in the art that various changes and modifications can be made therein without departing from the scope of the invention as defined in the appended claims.

What is claimed is:

1. A digital ohmmeter comprising the combination of a first differential input operational amplifier, and an integrating capacitor connected between the output of said first amplifier and the inverting input thereof; and means for generating an analog signal corresponding to the value of a resistance to be measured, said signal generating means including a current source, a second differential input operational amplifier having an inverting input connected to said current source, and resistive feedback means connected between the output of said second amplifier and said inverting input, the non-inverting input of said second amplifier being connected to the inverting input of said first amplifier; an integrating and gain adjusting resistor means of known resistance value connected to the inverting input of said first amplifier and the non-inverting input of said second amplifier, resistor circuit means for interconnecting the output of said second amplifier to the non-inverting input of said first amplifier and to a resistor of unknown value to cause said first amplifier output to produce a voltage ramp component which departs from a datum level with a slope of one sign, means for selectively connecting a reference current to the inverting input of said integrating amplifier a predetermined time after said first ramp component departs from said datum level to cause said amplifier output to produce a second voltage ramp component having a slope of the opposite sign, means for detecting the arrival of the second ramp component having the slope of opposite sign at a datum level; a counter; means for accumulating a pulse count in said counter during the interval between the change of sign of said slopes and the arrival of the second ramp component at the datum level, and means for displaying the count accumulated in said counter during said interval as a representation of resistance value.

2. A digital ohmmeter according to claim 1 wherein at least two of said resistive feedback means, said integrating and gain adjusting resistor and said resistor circuit means includes a plurality of fixed resistors, and switch means for selecting desired ones of said resistors.

* * * * *